US 6,708,202 B1

(12) United States Patent
Shuman et al.

(10) Patent No.: US 6,708,202 B1
(45) Date of Patent: Mar. 16, 2004

(54) METHOD FOR HIGHLIGHTING INFORMATION CONTAINED IN AN ELECTRONIC MESSAGE

(75) Inventors: Andrew W. Shuman, Seattle, WA (US); Se-Wai Lee, Bellevue, WA (US); Eric L. Van Doren, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/133,390

(22) Filed: Aug. 13, 1998

Related U.S. Application Data

(62) Division of application No. 08/732,969, filed on Oct. 16, 1996, now abandoned.

(51) Int. Cl.[7] .............................................. G06F 13/00
(52) U.S. Cl. ...................................... 709/206; 709/207
(58) Field of Search ................................ 709/201–203, 709/219, 200.31, 200.28, 200.24, 318, 206–207; 345/326, 329; 380/49, 331, 906; 340/825.18, 825.31, 825.07; 707/9, 10, 515

(56) References Cited

U.S. PATENT DOCUMENTS

| | | | | |
|---|---|---|---|---|
| 5,287,488 A | * | 2/1994 | Sakata et al. ............... 395/500 |
| 5,377,354 A | * | 12/1994 | Scannell et al. ............ 395/650 |
| 5,493,692 A | * | 2/1996 | Theimer et al. ........... 455/26.1 |
| 5,579,472 A | * | 11/1996 | Keyworth, II et al. ...... 345/326 |
| 5,647,002 A | * | 7/1997 | Brunson ....................... 380/49 |
| 5,923,848 A | * | 7/1999 | Goodhand et al. .......... 709/219 |

OTHER PUBLICATIONS

"Respond to a Meeting Request," excerpt from on–line help for Microsoft Schedule + software, Version 7.0a, ©1992–1996.

* cited by examiner

Primary Examiner—Robert B. Harrell
Assistant Examiner—Hien C. Le
(74) Attorney, Agent, or Firm—Merchant & Gould

(57) ABSTRACT

A form for displaying an electronic message item includes an information object that highlights important information about the message. The information displayed in the information object is automatically derived by examining the message properties that constitute the message item. The examination of the message properties includes applying a series of if-then statements to predetermined message properties. If the results of one or more of the if-then tests are true, the program composes one or more information items that reflect the state of the message item. The program will also examine data external to the message item. The information items are composed in a natural language format and are prioritized prior to being displayed in the information object.

17 Claims, 12 Drawing Sheets

| Mail | | Compose Message | Read Note | Sent Note |
|---|---|---|---|---|
| 0. | Unsent | This message has not been sent | n/a | n/a |
| | Saved and Unsent | | | |
| 1. | Voting | | | |
| | Voting requested | Please vote using the choice buttons above | same as compose | same as compose |
| | Voting response | This vote is case for: <response chosen>. | same as compose | |
| 2. | Follow-up set | | | |
| | Follow-up set | Please <follow-up tag> by <due date>) | same as compose | same as compose |
| 3. | Follow-up complete | | | |
| | Follow-up complete | n/a | Completed on <date/time>. | same as read |
| 4. | Tracking state | | | |
| | Voice response tally | n/a | n/a | <choice 1>:<x>; <choice 2>:<y>; etc. |
| | Tracking tally | n/a | n/a | Delivered to <x> recipients; read by <y> recipients; not read by <z> recipients; could not be delivered to <v> recipients. |
| 5. | Forwarded/Replied | | | |
| | forwarded/replied | n/a | You forwarded/replied to this message on <date/time>. | same as read |
| 6. | Sensitivity | | | |
| | Sensitivity set | Please treat this as confidential/personal/private | same as compose | same as compose |
| 7. | BCC'ed | | | |
| | Bcc'ed | n/a | You were Bcc'ed on this message | same as read |
| 8. | Hi/Low Importance | | | |
| | Importance other than normal | This message has high/low importance. | same as compose | same as compose |
| 9. | Forwarded by a rule | | | |
| | x 400 autoforward prop | n/a | This message was automatically forwarded | n/a |
| 10. | Intended for someone else | | | |
| | Intended for someone else set | n/a | This message was intended for <?> | n/a |

FIG. 10

| Appointments | Regular Appt/Compose Mtg/Org. Mtg | Meeting Request | Meeting Attendee | Meeting Response |
|---|---|---|---|---|
| 0. Unsent | | | | |
| Saved and Unsent | This message has not been sent. | n/a | n/a | same as regular |
| 1. In the Past/ Conflicts/Adjacent | | | | |
| In the past | The appointment occurs in the past. | same as regular | same as regular | n/a |
| Conflicts with other appts | This appointment conflicts with other another appointment on your calendar (in the next 13 months). | Same as regular | same as regular | n/a |
| Adjacent to other appts | This appointment is adjacent to another appointment on your calendar. | same as regular | same as regular | n/a |
| 2. Delegate copy | | | | |
| Delegate receives forwarded copy | n/a | Please respond on behalf of <manager name>. | n/a | n/a |
| 3. Recurrence | | | | |
| Recurring | Occurs every <recurrence pattern from start time to end time> beginning <date> [until <date>]. | same as regular | same as regular | n/a |
| 4. Meeting state | | | | |
| No response | No responses have been received. | n/a | n/a | n/a |
| Accepted/Declined | <x> accepted; [<y> tentatively accepted]; <z> declined. | n/a | Accepted/tentatively accepted/declined on <date/time> (by <assistant's name>]. | Yes, I will attend/No, I will not attend/Maybe I will attend |
| Cancelled | This meeting has been cancelled | same as regular | same as regular | n/a |

FIG. 11

| Tasks | Regular Task/Compose Assign./Copy | Task Response | Task Assigned to Me |
|---|---|---|---|
| 0. Unsent | | | |
| Unsent and saved | This message has not been sent. | same as regular | n/a |
| 1. Due State | | | |
| Has a due date of less than 7 days | This task due tomorrow/today/in <x> days. | n/a | same as regular |
| Overdue | This task was due yesterday/is overdue by <x> days. | n/a | same as regular |
| Completed | This task was completed on <date/time>. | n/a | same as regular |
| 2. Recurrence | | | |
| Recurring | This task occurs every <recurrence pattern> beginning <start date> [until <end date>]. | n/a | same as regular |
| 3. Delegation State | | | |
| Sent to multiple | This task was delegated to multiple people. No updates will be tracked. | n/a | same as regular |
| No response | Waiting for response from recipient. | n/a | n/a |
| Assigned by, on | n/a | | This task was delegated to you by <name> on <date>. |
| Accepted/Declined | Accepted/declined by <owner name> on <date/time>. | Yes, I will accept this task/No, I decline this task | Accepted/declined on <date/time>. |
| Last update sent | Last update sent on <date/time>. | n/a | same as regular |
| Due date changed | Due date changed on <date/time>. | n/a | same as regular |

FIG. 12

METHOD FOR HIGHLIGHTING INFORMATION CONTAINED IN AN ELECTRONIC MESSAGE

CROSS REFERENCE TO RELATED APPLICATION

This application is a division of application Ser. No. 08/732,969, filed Oct. 16, 1996 now abandoned, entitled—SYSTEM AND METHOD FOR HIGHLIGHTING INFORMATION CONTAINED IN AN ELECTRONIC MESSAGE.

TECHNICAL FIELD

The present invention relates to a system and method for organizing electronic messages, and more particularly relates to a system and method for automatically extracting and highlighting information contained in an electronic message.

BACKGROUND OF THE INVENTION

Electronic mail (e-mail) and other types of electronic messages are becoming extremely popular. Business users increasingly rely on electronic messages to share ideas, transmit documents, schedule meetings, and perform a multitude of other everyday tasks.

These tasks may be accomplished by a variety of software programs. For example, e-mail programs facilitate the transmission of messages between users. Messaging-enabled scheduling programs allow users to request and schedule meetings and appointments via electronic messages. Computer programs known as desktop information managers attempt to coordinate the growing stream of electronic communications by incorporating e-mail, a calendar, task management, contact management, notes, and journal features into a single application program.

The increased reliance on electronic messaging has resulted in a great increase in the number of electronic messages a user sends and receives daily. Sending and receiving a large number of electronic messages can make it very difficult and time consuming for a user to read, organize, and respond to his or her messages. When a user tries to review a large number of messages, it is very easy for the user to overlook critical information associated with a message item.

Current e-mail systems provide users with a few simple ways to organize and manage their e-mail inbox. For example, one mechanism for identifying and sorting important messages is for the sender of the message to set a priority level that the recipient will receive with the message. The sender may provide information about the e-mail message in a "subject" line. For example, the sender may also set the priority to "urgent" for an e-mail message or type "urgent" in the "Subject" field. However, these mechanisms for setting priorities can be somewhat ineffective because they do not specifically identify what action the recipient needs to take. Furthermore, if the recipient does not respond immediately, the user may simply forget to take the appropriate action at a later time.

Some e-mail programs allow senders to define a specific follow-up task, which is displayed to the recipient in a separate field. The follow-up task may include a due date by which the task is to be complete. For example, the sender may include a message flag that says "please respond by Friday." Although this feature is useful and allows a sender to highlight important information, it requires the sender to manually enter the information. In addition, the information displayed to the recipient is limited to what the sender has entered in the message tag field.

Some messaging-based scheduling programs provide a conflict checking feature. When a user receives an electronic message that includes a new meeting request, the scheduling program automatically compares the date and time of the proposed meeting with other appointments on the user's calendar. If there is a conflict, the program will provide the user with a warning message. Some messaging-based scheduling programs also warn a user of previously scheduled appointments that are "adjacent" the proposed meeting. These features prevents the user from inadvertently scheduling a meeting that conflicts with a prior engagement.

Although these features help a user review, organize, and respond to his or her electronic messages, they are limited to information provided by the sender, or associated with only one type of item.

Therefore, there is a need in the art for an improved method for extracting, calculating, and displaying critical information associated with an electronic message item, such as an e-mail message or meeting request. This method should automatically determine the state of the message item and prominently display critical information in an easily readable form. Automatically extracting and prominently displaying critical information would reduce the chance that a user would inadvertently overlook critical information, without also requiring additional input from the message sender.

SUMMARY OF THE INVENTION

The present invention satisfies the above-described needs by providing a system and method for highlighting information contained in an electronic message item. The present invention provides an information object that is used to highlight important information that is extracted or derived from the contents of the message item. The information object is displayed in a form along with the contents of the message item. This helps draw the user's attention to the important information and virtually eliminates the possibility that the user will overlook the important information.

In one aspect, the present invention provides a method for highlighting information associated with an electronic message item that includes a plurality of message properties. The method includes determining the state of the message item and composing an information item describing the state of the message item. The message item is displayed along with an information object that includes the information item.

More particularly described, the present invention determines the state of the message item by examining a plurality of message properties and, in some cases, data that is external to the message item. Composing an information item can include selecting a predefined text string, dynamically forming a text string in response to the state of the message item, or performing a calculation involving at least one of the message properties and incorporating the results of the calculation in the information item. Multiple information items are prioritized prior to being displayed.

In another aspect, the present invention provides a computer system for highlighting information associated with a message item. The computer system includes a processing unit, an input device connected to the processing unit, and a display device connected to the processing unit. The processing unit is operative to examine a plurality of message properties associated with the message item and compose one or more information items describing the results of the examination of the message properties. The processing unit is further operative to display the message item on the display device and display one or more information items in an information object associated with the message item.

In yet another aspect, the present invention provides a computer-readable medium on which is stored a computer program for highlighting information associated with an electronic message item. The computer program comprises instructions which, when executed by a computer, perform the step of testing the state of a plurality of message properties associated with the message item. In response to the state of the message properties, the program provides least one information item indicating that at least one message property has a predetermined state. The program displays the message item, an information object, and at least one information item in the information object.

The various aspects of the present invention may be more clearly understood and appreciated from a review of the following detailed description of the disclosed embodiments and by reference to the appended drawings and claims.

BRIEF DESCRIPTION OF THE DRAWINGS

FIG. 10 is an matrix illustrating an exemplary hierarchy of properties that are examined by a form for displaying e-mail messages.

FIG. 11 is an matrix illustrating an exemplary hierarchy of properties that are examined by a form for displaying appointment items.

FIG. 12 is an matrix illustrating an exemplary hierarchy of properties that are examined by a form for displaying task items.

DETAILED DESCRIPTION OF THE PREFERRED EMBODIMENT

Figure 1:
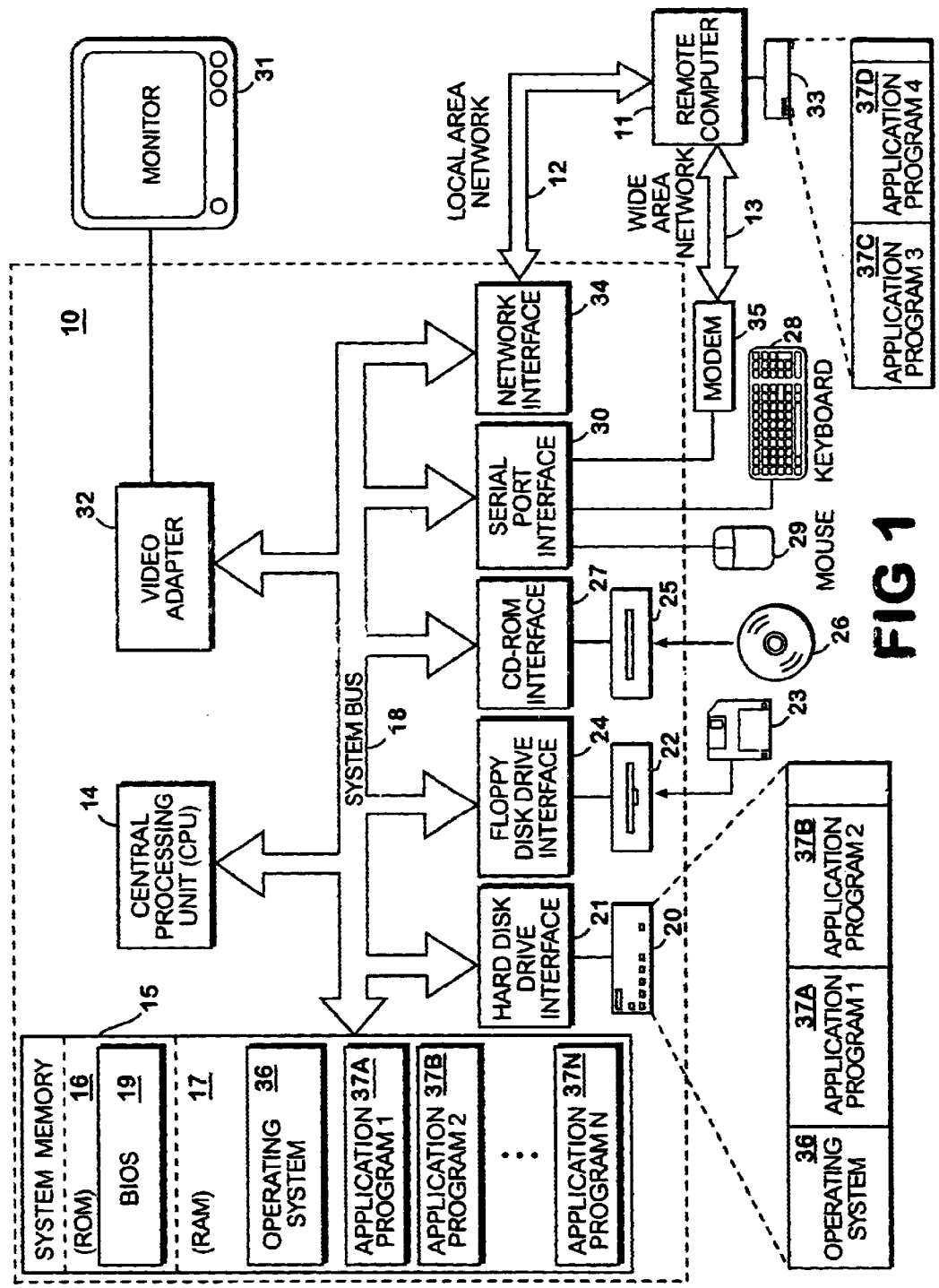
FIG. 1 is a block diagram of a personal computer that provides the operating environment for the preferred embodiment of the present invention.

The present invention is directed to features associated with a desktop information manager that includes e-mail, scheduling, and task assignment features. The present invention automatically reviews the contents of an electronic message item, such as an e-mail message or meeting request, and provides an intelligent summary of the state of the message item. The present invention dynamically compiles information from many different properties associated with the message item. The summary items are prioritized and prominently displayed using natural language statements. By drawing information from a variety of properties and displaying the results in a concise, easy-to-read manner, the present invention ensures that a user is notified of the most important properties of the message item.

An exemplary embodiment of the present invention is represented by the "MICROSOFT OUTLOOK" program, which is a workgroup desktop information management program published by Microsoft Corporation of Redmond, Wash. Briefly described, the preferred program allows users to manage their own calendar, messages, tasks, notes, and contacts and to share this information with others. Like many personal information managers, the preferred application program is divided into several modules, including a calendar manager, a task list manager, a contact manager, a message manager (e-mail), and a notes manager.

Although the preferred embodiment will be generally described in the context of a program and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks, enterprise-wide computer networks, and the global Internet.

The detailed description that follows is represented largely in terms of processes and symbolic representations of operations performed by conventional computer components, including a processing unit, memory storage devices for the processing unit, display devices, and input devices. Furthermore, these processes and operations may utilize conventional computer components in a heterogeneous distributed computing environment, including remote file servers, remote compute servers, and remote memory storage devices. Each of these conventional distributed computing components is accessible by the processing unit via a communications network.

The processes and operations performed by the computer include the manipulation of signals by a processing unit or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, data, objects, properties, flags, types, identifiers, values, elements, symbols, characters, terms, numbers, points, records, images, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, receiving, sending, transmitting, replying, etc. which are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and the preferred operating environment will be described.

The Operating Environment

FIGS. 1–5 illustrate various aspects of the preferred computing environment in which the present invention is designed to operate. Those skilled in the art will immediately appreciate that FIGS. 1–5 and the associated discussion are intended to provide a brief, general description of the preferred computer hardware and program modules, and that additional information is readily available in the appropriate programming manuals, user's guides, and similar publications.

The Computer Hardware

FIG. 1 illustrates a conventional personal computer 10 suitable for supporting the operation of the preferred embodiment of the present invention. As shown in FIG. 1, the personal computer 10 operates in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or compute server.

The personal computer 10 includes a processing unit 14, such as the 80486 or "PENTIUM" microprocessors manufactured by Intel Corporation of Santa Clara, Calif. The personal computer also includes system memory 15 (including read only memory (ROM) 16 and random access memory (RAM) 17), which is connected to the processing unit 14 by a system bus 18. The preferred computer 10 utilizes a BIOS 19, which is stored in ROM 16. Those skilled in the art will recognize that the BIOS 19 is a set of basic routines that helps to transfer information between elements within the personal computer 10. Those skilled in the art will also appreciate that the present invention may be implemented on computers having other architectures, such as computers that do not use a BIOS, and those that utilize other microprocessors, such as the "MIPS" or "POWER PC" families of microprocessors from Silicon Graphics and Motorola, respectively.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM drive 25, which is used to read a CD-ROM disk 26, is connected to the system bus 18 via a CD-ROM interface 27. A user enters commands and information into the personal computer 10 by using input devices, such as a keyboard 28 and/or a pointing device, such as a mouse 29, which are connected to the system bus 18 via a serial port interface 30. Other types of pointing devices (not shown in FIG. 1) include track pads, track balls, pens, head trackers, data gloves and other devices suitable for positioning a cursor on a computer monitor 31. The monitor 31 or other kind of display device is connected to the system bus 18 via a video adapter 32.

The remote computer 11 in this networked environment is connected to a remote memory storage device 33. This remote memory storage device 33 is typically a large capacity device such as a hard disk drive, CD-ROM drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art will quickly recognize that the modem 35 may also be internal to the personal computer 11, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as an operating system 36, application programs 37, and data are provided to the personal computer 10 via computer-readable media. In the preferred computer, the computer-readable media include the local or remote memory storage devices, which may include the local hard disk drive 20, floppy disk 23, CD-ROM 26, RAM 17, ROM 16, and the remote memory storage device 33. In the preferred personal computer 10, the local hard disk drive 20 is used to store data and programs, including the operating system and programs.

The Operating System

Figure 2:
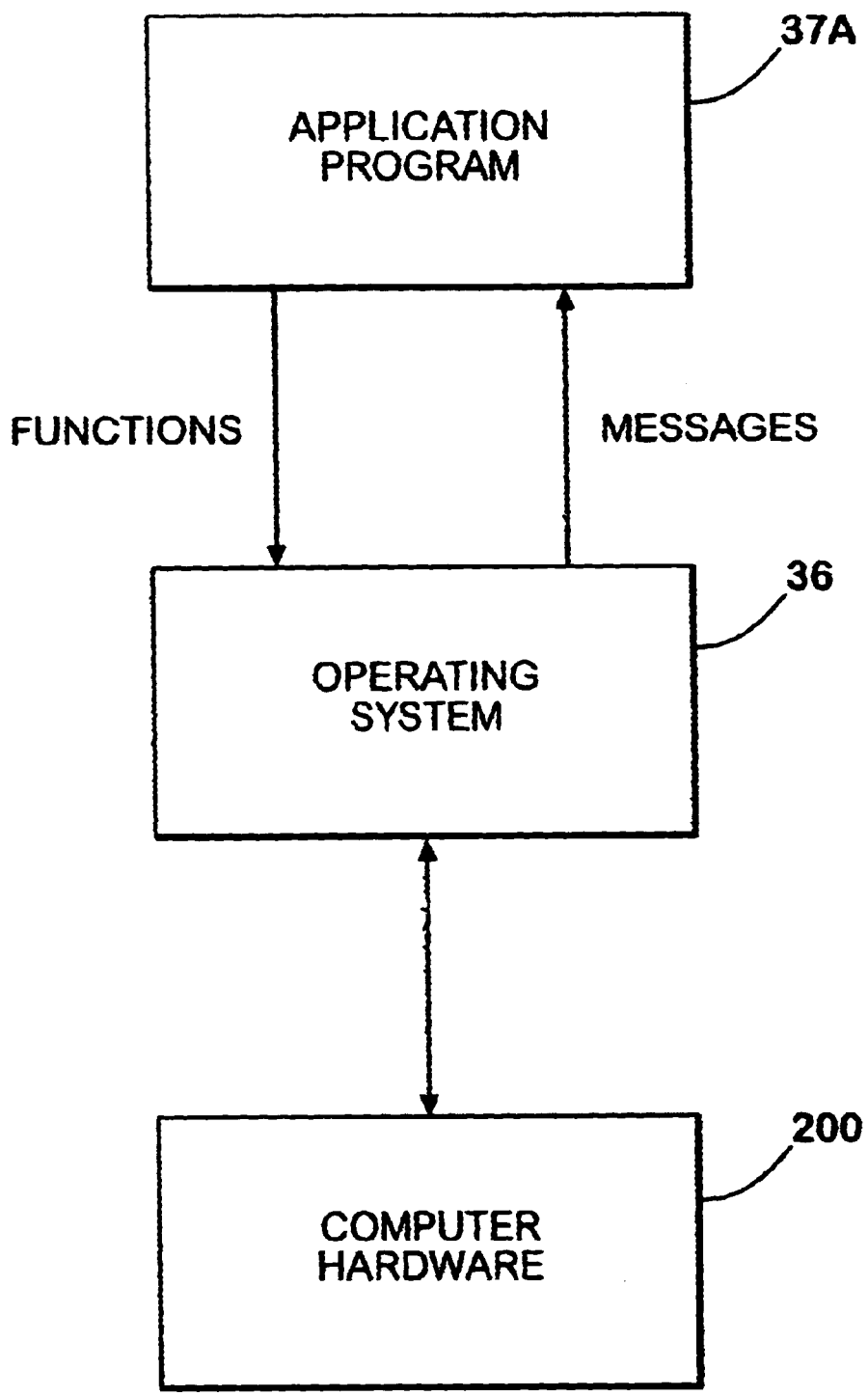
FIG. 2 is a block diagram illustrating the interface between a computer's input/output devices, an operating system, and an application program.

FIG. 2 is a simplified block diagram illustrating the interaction between the computer hardware 200, the preferred operating system 36, and an application program 37a. Referring now to both FIGS. 1 and 2, when the personal computer 10 is turned on or reset, the Basic Input/Output System (BIOS) 19, which is stored in the ROM 16, instructs the processing unit 14 to load the operating system 36 from the hard disk drive 20 into the RAM 17. Once the operating system 36 is loaded into RAM 17, the processing unit 14 executes the operating system 36 and causes the visual elements associated with the user interface of the operating system 36 to be displayed on the monitor 31.

The operating system 36, in conjunction with the BIOS 19 (FIG. 1) and associated device drivers, provides the basic interface between the computer's resources, the user, and the application program 37a. The operating system 36 interprets and carries out instructions issued by the user. For example, when the user wants to load an application program 37a, such as a program module embodying the present invention, the operating system 36 interprets the instruction (e.g., double clicking on the application program's icon) and causes the processing unit 14 to load the program code into RAM 17 from either the local hard disk drive 20, floppy disk 23, CD-ROM 26, or the remote memory storage device 33. Once the application program 37a is loaded into the RAM 17, it is executed by the processing unit 14. In case of large programs, the processing unit 14 loads various portions of program modules into RAM 17 as needed.

As discussed earlier, the preferred embodiment of the present invention is embodied in the "MICROSOFT OUTLOOK" program, which is designed to operate in conjunction with Microsoft Corporation's "WINDOWS 95" or "WINDOWS NT" operating systems. However, it should be understood that the invention can readily be implemented in other operating systems, such as Microsoft Corporation's "WINDOWS 3.1" operating system, IBM Corporation's "OS/2" operating system, and the operating system used in "MACINTOSH" computers manufactured by Apple Computer, Inc.

The operating system 36 provides a variety of functions or services that allow an application program 37a to easily deal with various types of input/output (I/O). This allows the application program 37a to issue relatively simple function calls that cause the operating system 36 to perform the steps required to accomplish various tasks, such as displaying text on the monitor 31 (FIG. 1) or printing text on an attached printer (not shown). Generally described (with reference to FIG. 2), the application program 37a communicates with the operating system 36 by calling predefined functions provided by the operating system 36. The operating system 36 responds by providing the requested information in a message or by executing the requested task.

From this brief description, it should be appreciated that operating systems, such as the "WINDOWS 95" and "WINDOWS NT" operating systems, are quite complex and provide a wide variety of services that allow users and programs to utilize the resources available in the personal computer. Those skilled in the art will be familiar with operating systems and their various features, which include, but are in no means limited to, the specific features and functions described above.

The MAPI Messaging Architecture

In the context of the present invention, the primary interaction between the preferred program and the operating system involves messaging related tasks. The preferred operating system incorporates the Messaging Application Programming Interface (MAPI). The MAPI architecture is designed to make it easy for programmers to write messaging-enabled applications that are independent of the underlying messaging system. MAPI provides high-level function that can be used to implement sophisticated messaging features with a relatively small amount of code. The code deals only with functions for sending, receiving, and addressing electronic messages. The underlying messaging system is completely transparent. MAPI also provides other message-related functionality, such as access to address books.

Figure 3:
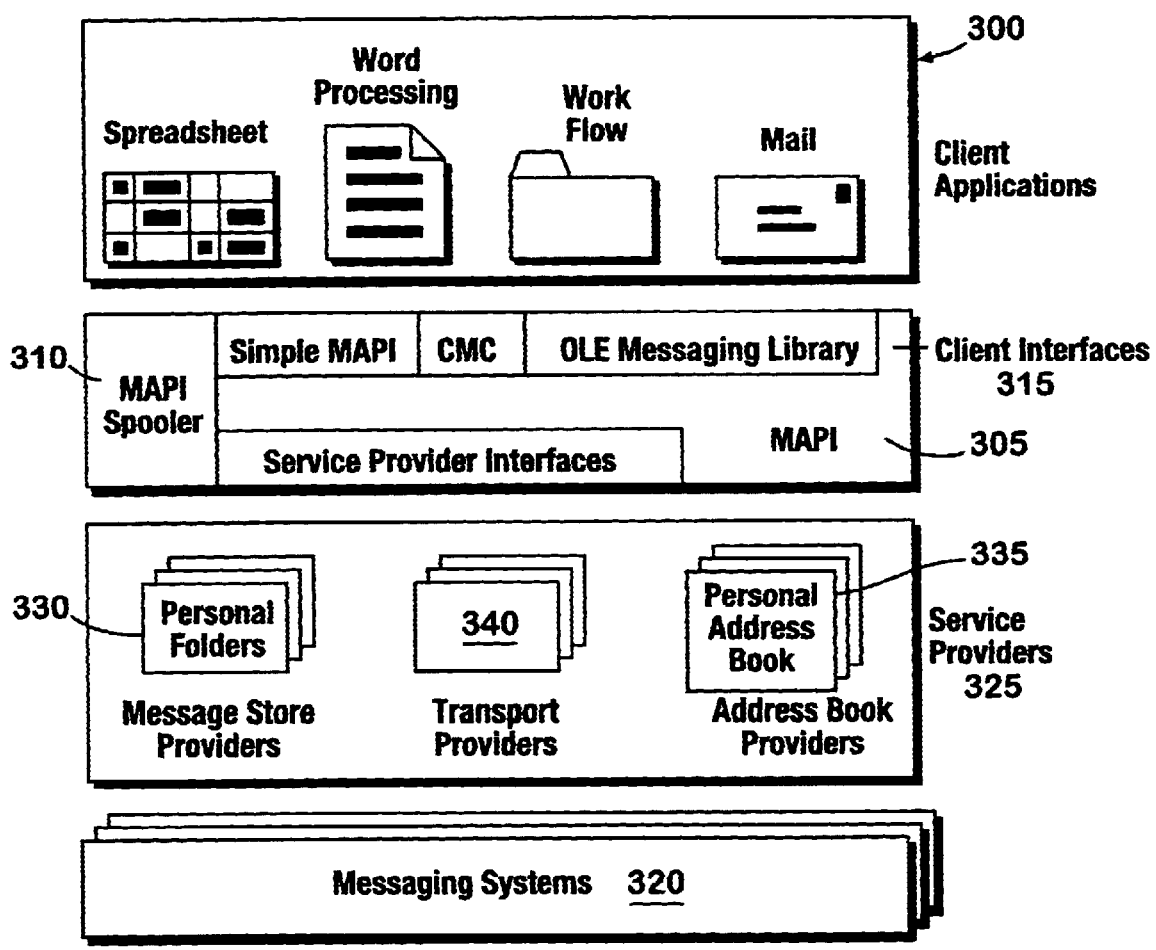
FIG. 3 is a diagram illustrating the modular architecture defined by the Messaging Application Programming Interface (MAPI).

FIG. 3 illustrates the modular architecture defined by MAPI. The client applications 300 are application programs that take advantage of the MAPI subsystem 305. Client applications 300 implement messaging tasks as either their primary or secondary focus. Messaging-based client applications, such as applications that send and receive electronic mail, implement messaging tasks as their primary focus. For non-messaging client applications, which are referred to as being "messaging-enabled" or "messaging-aware," it is a secondary feature.

The MAPI subsystem is made up of the MAPI spooler 310, a common user interface (not shown), and the programming interfaces 315. The MAPI spooler is a separate interface that is responsible for sending electronic messages to and receiving electronic messages from a messaging system. The common user interface is a set of dialog boxes that gives client applications a consistent look and users a consistent way to perform tasks.

The programming interfaces 315 are used by the MAPI subsystem 305, by client applications 300, and by service provider writers. The main programming interface is an object-based interface known as the MAPI programming interface, which is based on the OLE Component Object Model. Client applications may also utilize any of three other interfaces, including simple MAPI, Common Messaging Calls (CMC) and the OLE Messaging Library, which are primarily for messaging-enabled and messaging-aware client applications.

The MAPI spooler 310 is a separate process within the MAPI subsystem 305 and is responsible for sending electronic messages to and receiving electronic messages from a messaging system 320. The spooler runs as a background process and also performs several functions related to electronic message distribution. These include informing a client application when a new message has been delivered, invoking message preprocessing and post processing, generating reports that indicate that message delivery has occurred, and maintaining status on processed recipients.

The MAPI service providers 325 are located between MAPI subsystem 305 and the messaging systems 320. Service providers are drivers that connect MAPI client applications 300 to an underlying messaging system 320. Most messaging systems include three types of service providers: message store providers 330, address book or directory providers 335, and message transport providers 340. The service providers work with MAPI to create and send electronic messages in the following way. Electronic messages are created using a form that is appropriate for the specific type, or class, of message. The completed electronic message is addressed to one or more recipients. When the client sends the message, the message store provider 330 checks that each recipient has a unique and valid address and that the message has all of the information necessary for transmission. If there is a question about a recipient, such as can occur when there are multiple recipients with the same name, an address book provider resolves the ambiguity. The electronic message in then placed in the outbound queue.

Address book providers 335 handle access to directory information. Depending on the type of recipient and the address book provider, there is a wide range of information that can be made available. For example, all address book providers 335 store a recipient's name, address, and address type and organize the data using one or more containers. MAPI integrates all the information supplied by the installed address book providers into a single address book, thereby presenting a unified view to the client application. The users of client applications can view the contents of address book containers and in some cases modify it. MAPI's Personal Address Book is an example of a modifiable address book container that allows new entries to be added and exiting entries to be modified or deleted.

Figure 4:
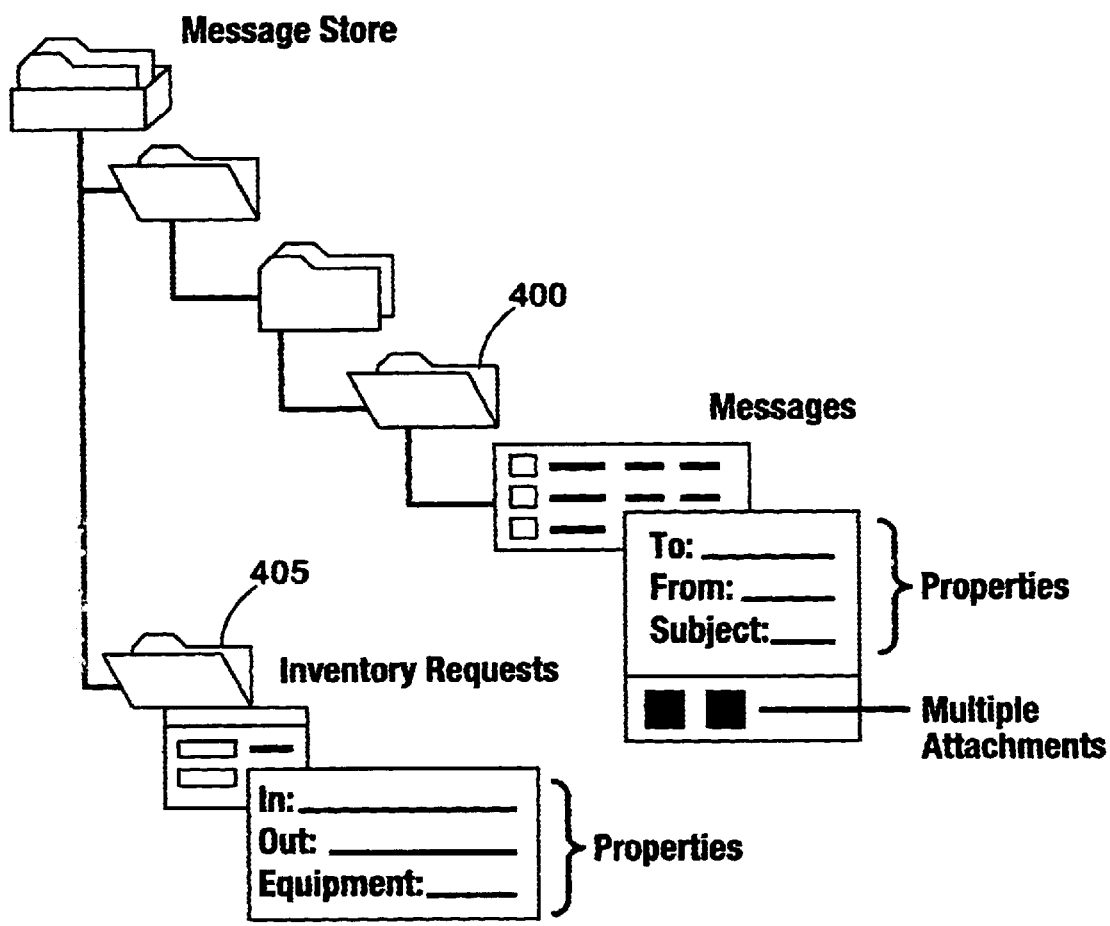
FIG. 4 is a diagram illustrating the hierarchical arrangement of a MAPI message store.

Message store providers 330 handle the storage and retrieval of electronic messages and other information for the users of a client application. As illustrated in FIG. 4, the message information is organized using a hierarchical system known as a message store, which is implemented in multiple levels, with containers called folders holding electronic messages of different types. There is no limit to the number of levels in a message store, and folders can contain many sub-folders.

Electronic messages are units of data that are transferred from one user or application to another user or application. Every message contains some text and envelope information, which is used for transmission. Some electronic messages include one or more attachments, or additional data related to and transported with a message. The attachments and additional data may be in the form of a file, another message, or an OLE object.

Transport providers 340 handle message transmission and reception. They control the interaction between the MAPI spooler 310 and the underlying messaging system 320. They also implement security if necessary and take care of any pre-processing and post-processing tasks that are required. Client applications 300 communicate with the transport providers 340 through a message store provider 330. When an incoming message is detected, the transport provider informs the MAPI spooler and the message is delivered to the appropriate message store. To handle outgoing messages, the message store moves the message to the outbound queue, informs the MAPI spooler, and the spooler transfers it to the appropriate transport providers.

The operation of these MAPI components is illustrated by describing the flow of an electronic message through these components. The user of a client application 300 sends an electronic message to one or more recipients. A message store provider 330 initiates the sending process and formats the message with additional information needed for transmission. The MAPI spooler 310 receives the electronic message, performs any required preprocessing, and delivers it to the appropriate transport provider 340. The transport provider 340 gives the message to its messaging system 320, which sends it to the intended recipient(s). When an electronic message is received, the transport provider 340 receives a message from its messaging system 320 and notifies the MAPI spooler 310. The spooler 310 performs any necessary post processing and informs the message store provider 330 that a new message has arrived. The notification causes the client application 300 to refresh its message display, which enables the user to read the new message.

Client application users can access a summary view of the messages contained with each folder or view them individually with a form. Whether the client displays a standard form supplied by MAPI or a custom form supplied by a form developer depends on the type, or class, of the message. In FIG. 4, the first folder 400 contains note messages and uses the MAPI standard note form. The second folder 405 contains inventory request messages and uses a custom inventory form. The information on both forms represents the properties, or attributes, of the message. Messages are the units of data transferred from one user to another. Every message contains some text, which is formatted simply or more intricately depending on the form that is used, and envelope information that is used for transmission.

A MAPI property is an attribute of a MAPI object, and describes something about the object, such as the subject line of a message of the address type of a distribution list. Every MAPI property has a value, a type, and an identifier. The value is the descriptive data, such as the text in a message body. The type describes the kind of data, such as a string, numeric, or Boolean. The identifier is the number that uniquely describes the property. The identifier and type are combined to form a "property tag," which is a constant that can be used to easily refer to the property. Property tags share a common format. they begin with the prefix "PR" and are made up of one or more words that describe the property. For example, PR_MESSAGE_BODY is the tag for the message body property. The property tag and value are stored together in system memory 15 (FIG. 1) as a single data structure.

MAPI also employs "profiles," which are collections of information about the message services and service providers that a user of a client application 300 wants to be available during a particular MAPI session. Every user has at least one profile. Multiple profiles may be used in some cases. For example, a user might have one profile to work with a server-based message store service and another profile to work with a message store service on the local computer. A user may have profiles on more than one computer. Similarly, a computer may store profiles for more than one user. Profiles provide a flexible way to select combinations of message systems.

In the MAPI environment, a form is a viewer for an electronic message. Each message has a message class that determines the particular form that is used as its viewer. MAPI defines a few messages classes and has implemented the forms for viewing these messages. Client application developers can create new message classes and custom forms for viewing messages with the new classes.

Figure 5:
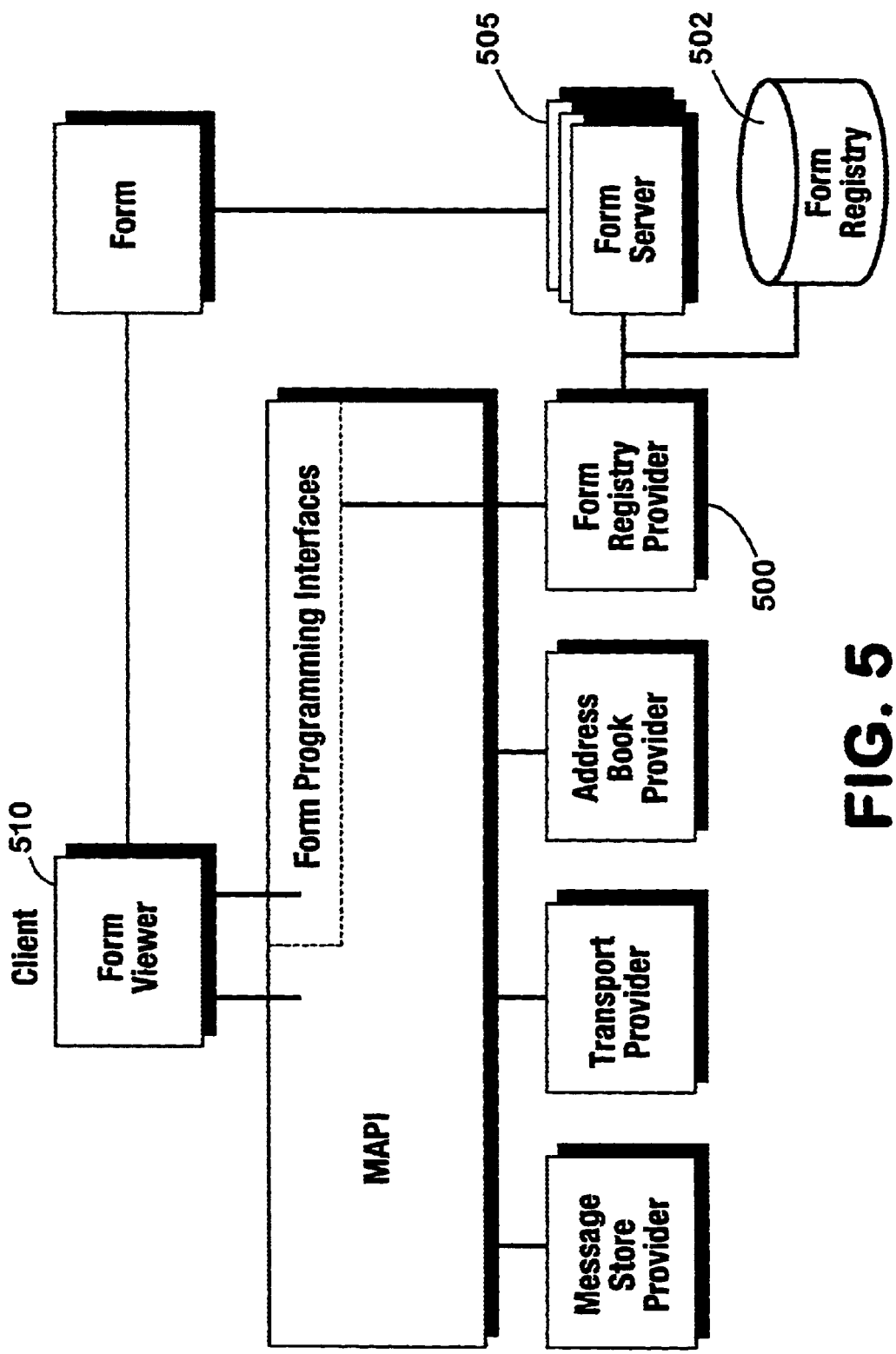
FIG. 5 is a diagram illustrating the MAPI form architecture.

Every custom form implements a set of standard menu commands (e.g., open, create, delete, and reply) and a set of commands that are specific to that particular form. These commands are also referred to as "verbs." FIG. 5 illustrates the MAPI form architecture, which involves three main components: a form registry provider 500, a form server 505, and a form viewer 510.

The form registry provider 500 maintains a library of information about all of the forms available on the computer and enables the client to select a form that is suitable for the message being displayed. Form data is stored in a form registry 502, which is stored in one of the computer's memory storage devices. The form server 505 is responsible for displaying the form and providing the information for the display. The form server manages the user's interaction with the form by interpreting the menu selections and processing the messages. The form viewer 510 is a component within a client application that contains the display and presents it to the user.

From the foregoing, it will be appreciated that MAPI provides a wide variety of features and functions in addition to those included in the brief description presented above. For additional information regarding MAPI, the reader may refer to the MAPI documentation, entitled Messaging Application Programming Interface (MAPI) version 1.0, which is published by Microsoft Corporation, and which is incorporated herein by reference.

An Exemplary Application Program

As mentioned above, an exemplary embodiment of the present invention is represented by the "MICROSOFT OUTLOOK" workgroup desktop information manager, which is published by Microsoft Corporation. The preferred client application is divided into several modules, including a calendar manager, a task list manager, a contact manager, a message manager (e-mail), and a notes manager. In the preferred client application, integration between the modules is both simple and extensive because all information is stored in a MAPI data store, which is an extensible, object-oriented database. The preferred application program incorporates the features of MAPI version 1.0.

All folders (containers) contain objects, or items. In the preferred application program, there are a variety of kinds of items: e-mail items, appointment items, task items, address items, etc. Items have a set of fields and a behavior associated with them. For example, an e-mail item has To, From, CC, Subject, date and time fields among others. The behavior of e-mail items includes knowledge of what it means to Forward or Reply/Reply All.

In the preferred application program, items consist of a variety of data, which are stored as MAPI properties. A user views and interacts with an item in the context of a form, which includes a variety of fields. In some cases, a field maps directly to a MAPI property. However, there can be a many-to-many mapping between a form's fields and the MAPI properties in which the corresponding data are stored. Similarly, there may be properties that are not displayed in any of a form's fields.

In the preferred application program, each item is initially created from a template, which provides a "mold" for the new items. A template describes the fields and properties associated with the item, including the data types, default values, formatting rules, etc. For example, there would be a default template for each type of item listed above: appointments, to-do items, notes, e-mail messages, etc.

A user can create custom forms by defining custom fields and properties. A user can create a new template by creating an item, customizing it by adding or deleting fields as necessary, setting initial values for fields and then saving it. The user can either create a new template (by giving it a new name) or replace the existing one.

From this brief description, those skilled in the art will appreciate that the preferred application program provides a wide variety of features and functions in addition to those included in the brief description presented above. For additional information regarding the "MICROSOFT OUTLOOK" application program, the reader may refer to the documentation that is distributed with the program.

The Preferred Method for Highlighting Information Associated With an Electronic Message The present invention provides a method for highlighting information contained in an electronic message, which may be an e-mail message, meeting request, or other form of electronic communication. Generally described, the present invention provides an information object (referred to as an "information bar" or "infobar") that is used to highlight important information that is extracted or derived from the contents of the electronic message. This helps draw the user's attention to the important information and virtually eliminates the possibility that the user will overlook the important information.

Figure 6:
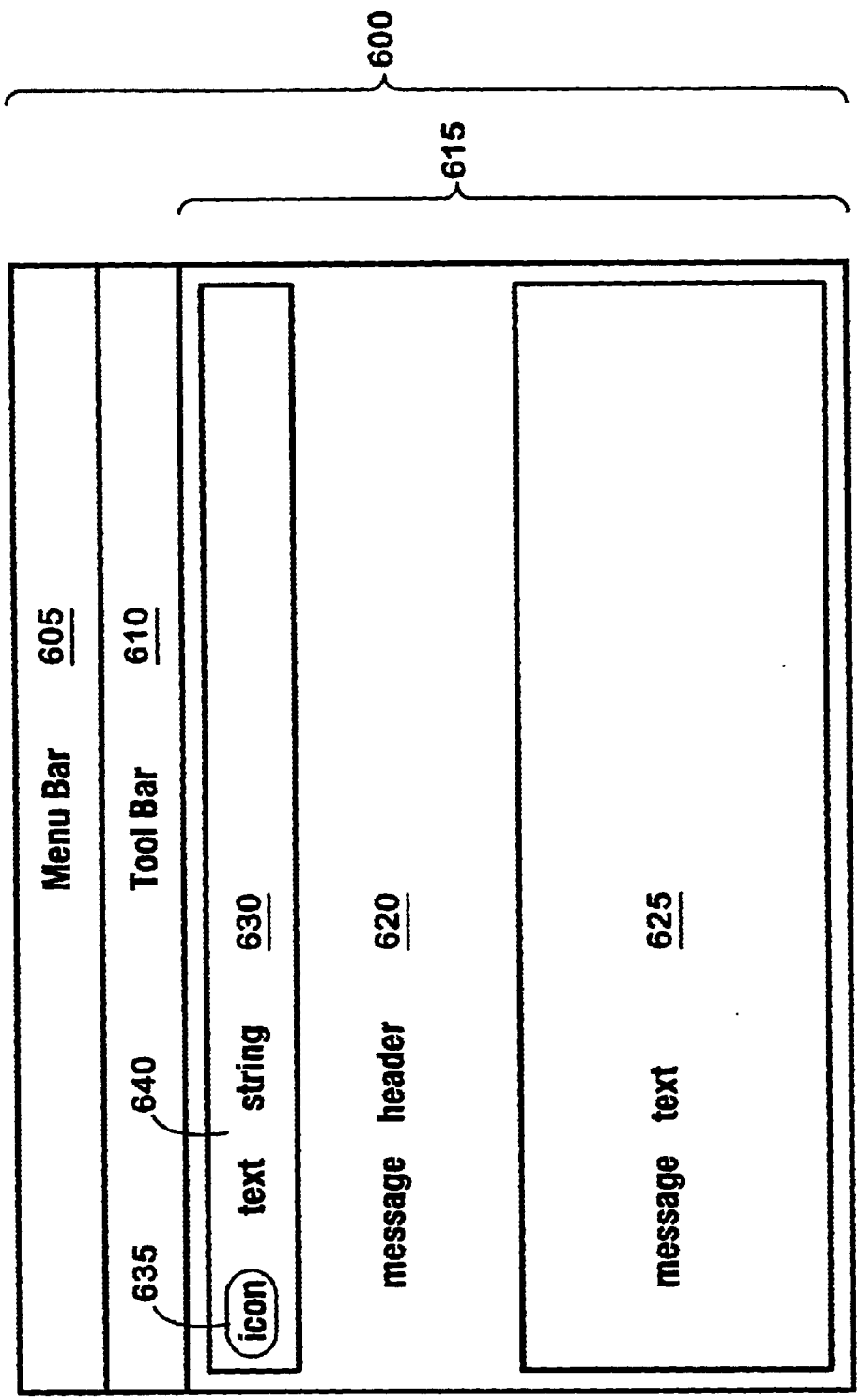
FIG. 6 is a diagram illustrating a generic electronic message item with an infobar.

FIG. 6 illustrates an exemplary embodiment of a display window 600 that is used to display an electronic message and an infobar. The display window 600 includes several features that will be familiar to those skilled in the art. For example, the display window 600 includes a menu bar 605 and a tool bar 610, which provide access to various commands and options associated with the preferred program module. A message window 615 is located beneath the tool bar 610. The message window 615 provides space for displaying message header information 620 (e.g., to, from, subject, etc.) and message text 625.

In addition to these common features, the message window 615 also includes a infobar 630, which is used to highlight important information about the message. The infobar 625 occupies the highest visibility real estate available in the message window 615 and is preferably displayed using a prominent graphical design and color. The high-profile location, graphical design and color make the infobar 630 readily visible. The infobar 630 includes one or more information items (also referred to as "information bar items" or "infobar items") that describe some aspect of the message item. Each information item includes an icon 635 and a text string 640. The icon 635 may be chosen to reflect the nature of the information conveyed in the text string 640.

Figure 7:
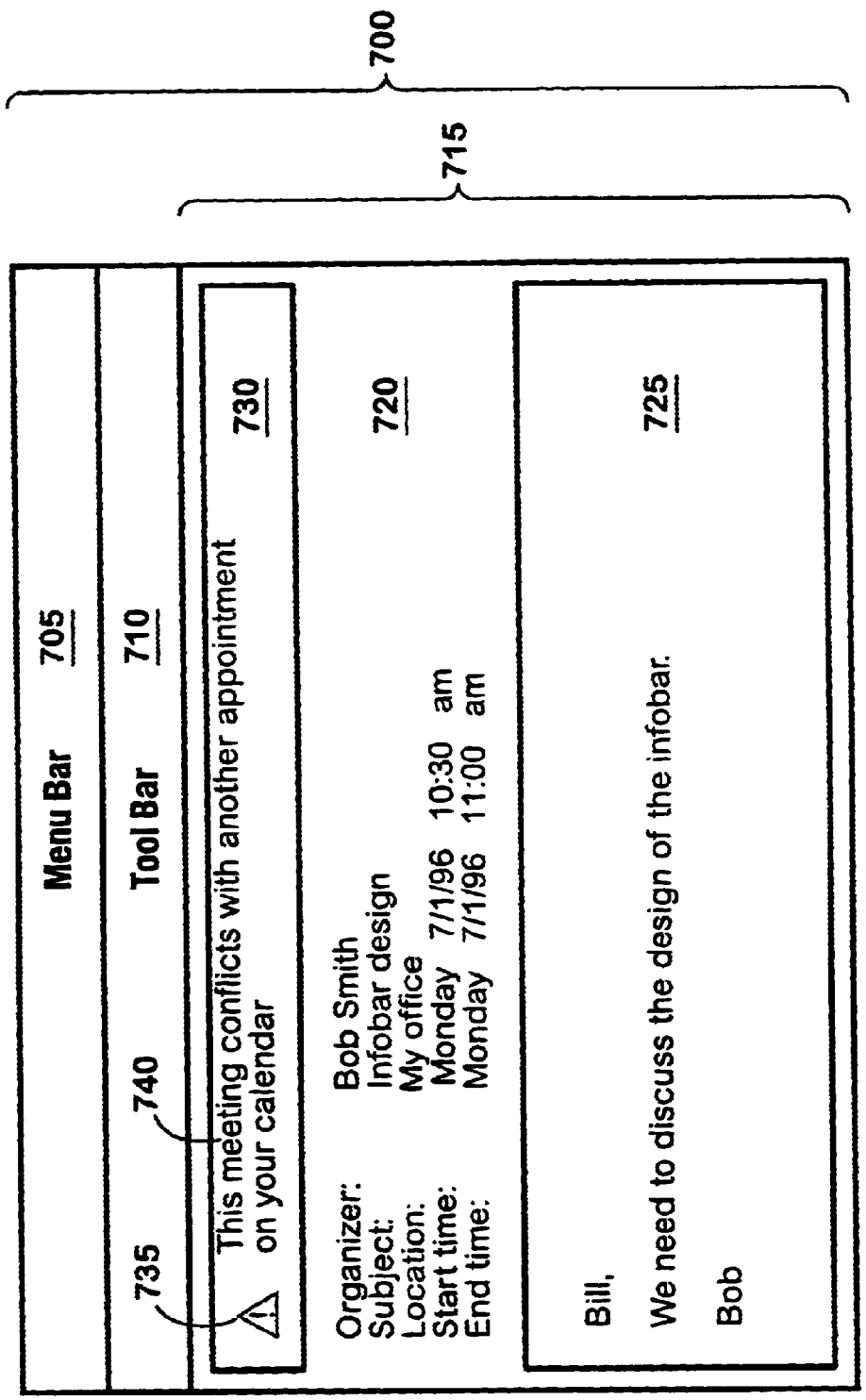
FIG. 7 is a diagram illustrating an exemplary meeting message item and an associated infobar.
Figure 8:
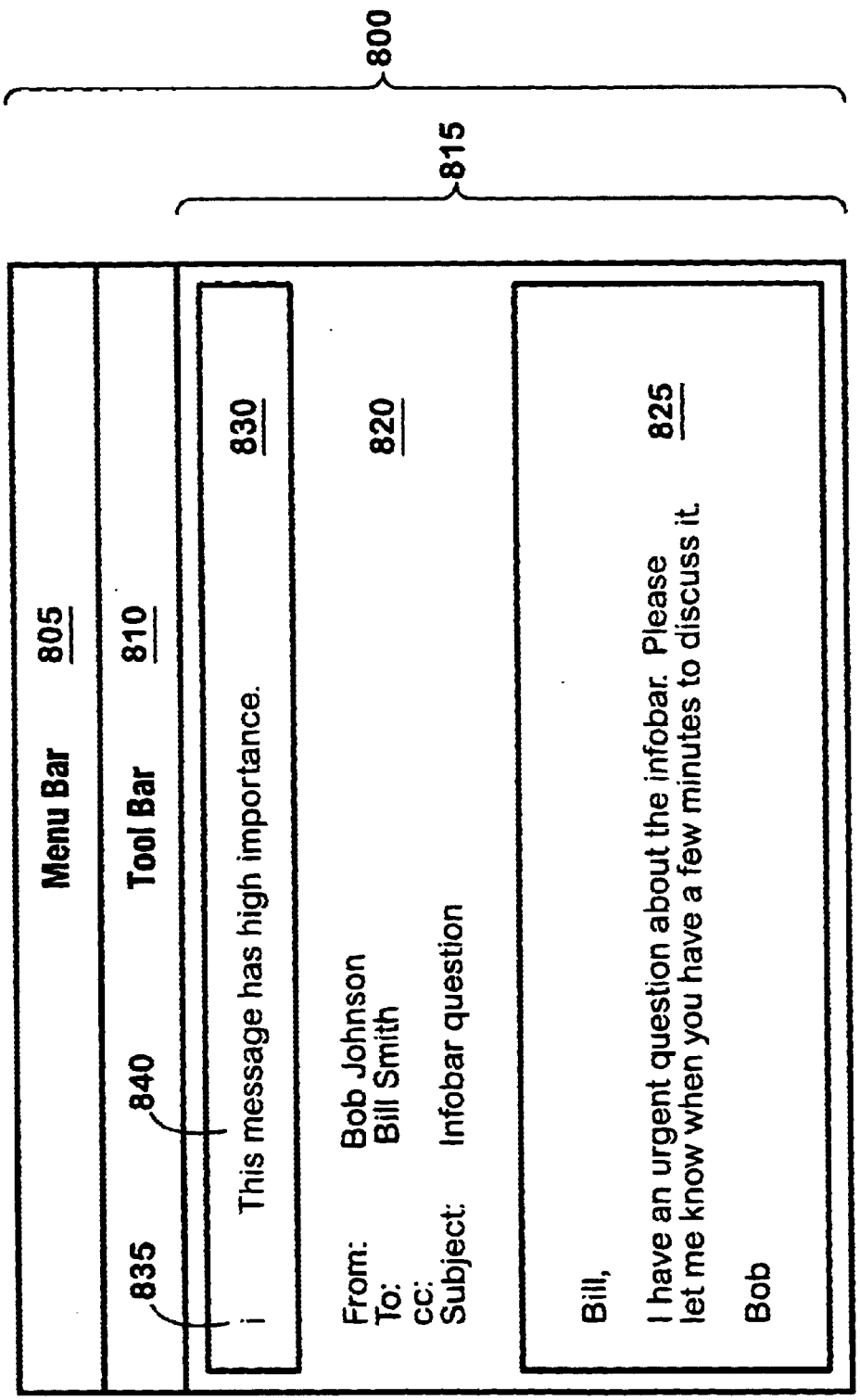
FIG. 8 is a diagram illustrating an exemplary e-mail item and an associated infobar.

FIGS. 7 and 8 provide examples of how an infobar can be used to display information when used with e-mail and meeting request message items.

FIG. 7 illustrates a display window 700 associated with a meeting request message item. In this example, the user (Bill) has received a meeting request message from Bob Smith. The user views the message in the display window 700, which includes a menu bar 705, tool bar 710, and a message window 715. The message window 715 displays header information 720, which includes the name of the meeting organizer and the subject, location, and time of the meeting. Beneath the header information 720, the message window 715 includes text 725, which was provided by the organizer.

The message window 715 also includes an infobar 730. When the user selects a meeting request message to be viewed, the form that is used to view the object automatically invokes code that evaluates the state of various message properties and determines what, if any, information should be displayed in the infobar 730. In this example, the program module has automatically checked the proposed meeting date against the user's calendar, and has determined that the proposed meeting date conflicts with an appointment that the user has already scheduled. Accordingly, the infobar 730 displays an information item that reports the conflict. In this case, the information item includes a warning icon 735 and a text string 740, which states "This meeting conflicts with another appointment on your calendar." Without the infobar 730, the user may not be immediately aware of the conflict.

FIG. 8 illustrates a display window 800 associated with an e-mail message. In this example, the user (Bill) has received an e-mail message from Bob Johnson. The user views the message in the display window 800, which includes a menu bar 805, tool bar 810, and a message window 815. The message window 815 displays header information 820, which includes the name of the sender and the subject of the message. Beneath the header information 820, the message window 815 includes the message text 825, which was provided by the sender.

The message window 815 also includes an infobar 830. When the user selects an e-mail message to be viewed, the form that is used to view the message automatically invokes code that evaluates various message properties and determines what, if any, information should be displayed in the infobar 830. In this example, the program module has automatically checked the message properties determined that the sender set the message priority to "high." Accordingly, the infobar 830 displays an information item that reports that the message priority is high. In this case, the information item includes an information icon 835 and a text string 840, which states "This message has high importance." Without the infobar 830, the user may overlook that level of importance placed on the message by the sender.

Figure 9:
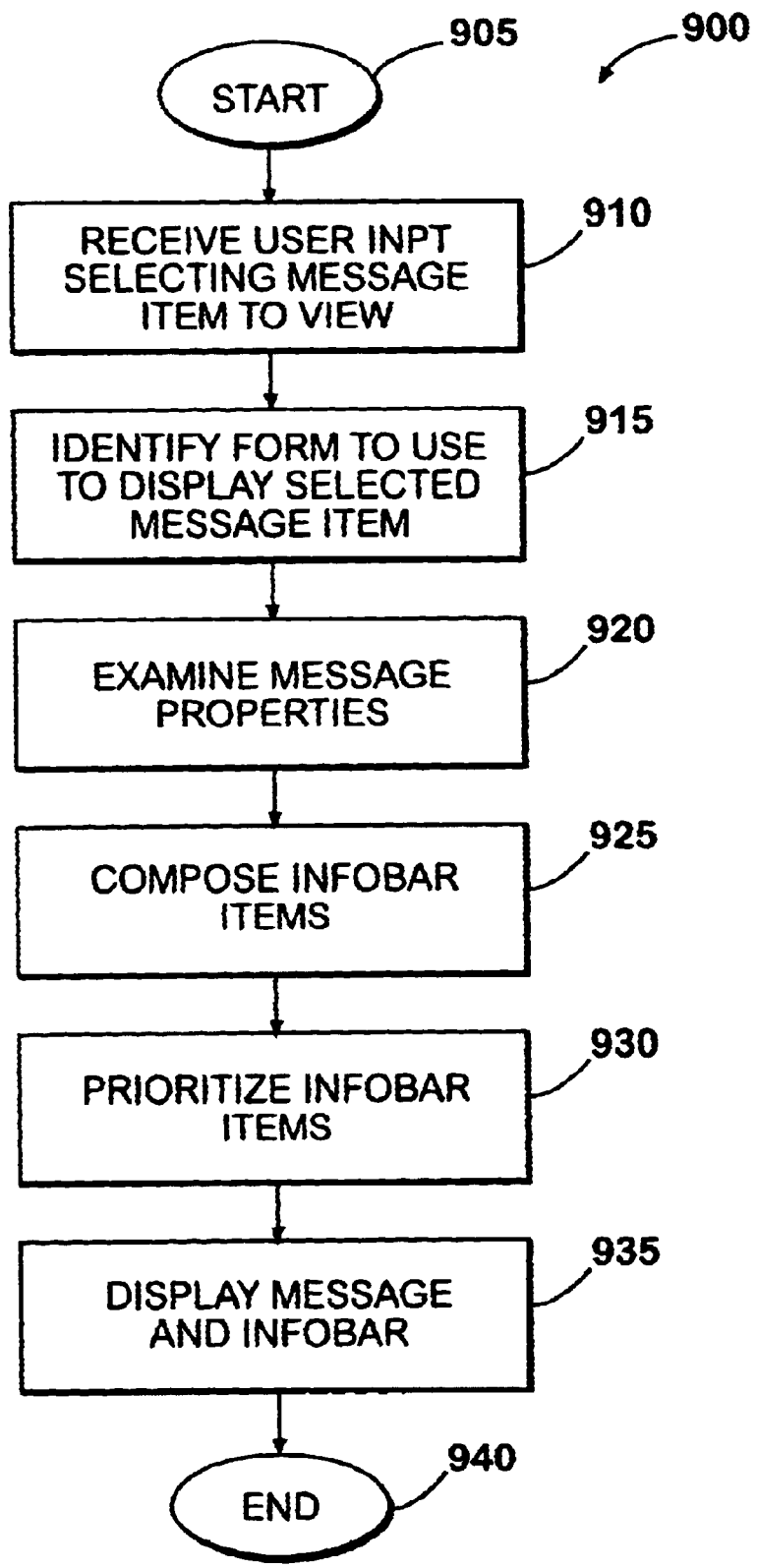
FIG. 9 is a flow diagram illustrating an exemplary method for determining the contents of an infobar.

FIG. 9 is a flow diagram illustrating an exemplary method 900 for highlighting information associated with an electronic message. However, before describing the specific steps associated with the method, it is helpful to provide a more general description of the operation of the infobar.

The preferred embodiment of the present invention operates by examining the properties that constitute the electronic message item and automatically gathering the summary information that is displayed in the infobar. The infobar data is not bound to any single property or field of the message item and does not require the user (either sender or recipient) to manually enter notification-type data.

Those skilled in the art will understand that an electronic message item (e.g., an e-mail message, appointment, task, etc.) is a data record that includes a plurality of properties. A property is a piece of information, such as the start time of a meeting or the subject or an e-mail message, within the item. A "form" provides a template or mechanism for viewing the properties associated with an item. The infobar is prominently displayed at the top of the form. The infobar includes a icon and text strings that are composed in response to the item's current state (as defined by its properties).

As mentioned above, different forms are used to display different types of electronic messages (e.g., e-mail, meeting request, etc.). Each form includes "controls" that are appropriate for the type of message with which they are used. For example, a meeting request form includes controls (typically displayed as buttons, text fields, etc.) that allows the user indicate the meeting date and time. Similarly, e-mail forms include controls that allow a user to indicate the subject and priority of the message.

Those skilled in the art will also appreciate that the controls displayed by a form also vary based on the context in which the message is being displayed, i.e., whether the message is being composed by a user, or has already been sent or received by a user. In the context of an e-mail message, a "compose" form will include controls that allow the user to send the message when composition is complete. Similarly, a "receive" form will include controls that allow a user to forward the message to others, or reply to the sender. A "sent" form may indicate to the sender when the message was sent, and allow the user to send it to others.

The infobar is implemented as a control that can be displayed in conjunction with various types of electronic message items (e.g., e-mail, meeting request) and in various message contexts (e.g., compose, sent, received). The information displayed in the infobar will vary in response to the type and context of the message item. Each type of form accesses a program module (referred to as "infobar code") that implements the infobar control. This infobar code determines the state of the message item by evaluating a series of if-then statements, which are specific to the type of item. From the outcome of the if-then statements, the infobar program module determines what infobar items should be displayed in the infobar, and composes those items.

Those skilled in the art will appreciate that the infobar is a calculated field in a form. When a form is invoked to view a message item, the infobar code performs a series of calculations and builds one or more text strings based on the outcome of the queries. In most cases, the queries involve only data included in the message. In other cases the calculations may involve data external to the message item (e.g., checking an appointment calendar maintained by the user). The resulting text strings are then prioritized and displayed in the infobar along with a suitable icon. The infobar code will be re-executed when any of the relevant message properties are changed.

The processes carried out by the infobar code are referred to generally as property promotion, external notification, and priority ranking. Property promotion utilizes data contained in the message properties that constitute the message item. External notification employs data that is external to the message item. Priority ranking applies predetermined priorities to the resulting information items in order to allow the most important data to be displayed at the top of the list in the infobar. If the number of items exceeds a predetermined number, only the highest priority items will be displayed in the infobar. Those skilled in the art will also appreciate that if the infobar code does not identify any data for the infobar, the infobar will not be displayed at all.

The property promotion feature employs several types of features, which are referred to as conditional, dynamic, computed, or state dependent.

Conditional property promotion refers to infobar items that are displayed only if the message item has certain properties or if certain actions have been performed on the message. If a certain property is present, or if certain actions are taken, the infobar code will display the infobar and include a predetermined message. The message itself does not vary.

Dynamic property promotion or variable replacement allows more information to be conveyed to the user by allowing the system to fill in portions of the infobar message. Such variables may include another user's name, a date, or an overdue period. For example, if the message properties indicate that a meeting occurs every week starting on August 1, the infobar message will be dynamically formatted to read "Occurs every week effective Aug. 1, 1996 from 1:00 pm to 2:00 pm," where the date and the times are filled in by the system. If the infobar did not have dynamic replacement, the presence of the recurring property may result in a simple conditional message such as "Occurs every week," which conveys less information to the user.

Computed information allows the infobar to include information that results from calculations performed on data from the message properties. The results are translated into a natural English sentence. For example, if a message includes a due date, the infobar will calculate the number of days between the current date and the due date, and display a message such as "Task due in 5 days" or "Task due tomorrow." This allows important information to be conveyed concisely and clearly without requiring the user to determine the time before the due date.

State dependent properties allow the contents of the infobar to vary depending on the state of a message property or the context of the current form. For example, a task-related electronic message includes an "acceptance" property, which indicates whether the recipient has accepted the task. When a user opens a received task request and the acceptance property is blank, the infobar displays "Please respond." After the user has accepted the task, the infobar displays "Accepted on Aug. 1, 1996 at 1:05 pm." Similarly, when the acceptance property is blank, the message originator's infobar will display "Waiting for response." After the task is accepted, the originator's infobar will display "Bob accepted on Aug. 1, 1996 at 1:05 pm."

A variation of conditional property promotion is referred to as user-initiated property promotion. This feature is based on the provision of one or more properties that are controlled by the person who originates the message. For example, the "MICROSOFT OUTLOOK" program provides a feature referred to message flagging, which allows a message sender to indicate a specific follow-up action and a due date. With message flagging, the sender determines whether the message will include a message flag, and if so, the text and due date associated with the message flag. The text and due date are stored as properties of the message item. This feature is described more completely in commonly assigned, co-pending U.S. patent application Ser. No. 08/658,840, filed May 31, 1996, and entitled "System and Method for Composing, Processing, and Organizing Electronic Mail Message Items," which is incorporated herein by reference.

In the context of the present invention, if a message flag is present, the text associated with the message tag is automatically deemed important enough to be included in the infobar. This feature is referred to as user-initiated property promotion because it allows a user to determine what will appear in an infobar.

The "MICROSOFT OUTLOOK" program also provides a voting feature that allows e-mail recipient to easily select one of a group of choices provided by the e-mail message sender. For example, a user may compose a message asking which type of food the recipients prefer for lunch, and provide a list of choices, such as hamburgers or pizza. The voting feature provides a control on the form that allows the recipients to click on their choice of hamburgers or pizza. The sender's copy of the message automatically tallies the results of the voting. The voting feature is also described in additional detail in above-referenced pending patent application.

In the context of the present invention, if the infobar determines that the message includes voting options, the infobar will display the message "Please vote." Similarly, once votes have been cast, the infobar on the sender's copy of the message will display the results of the voting.

External notification refers to the process by which the infobar presents information based on data that is external to the message item. For example, when an meeting request message item is received, the infobar is able to check the user's calendar for other appointments. The infobar may then be used to display information regarding conflicting appointments, or to let the user know of "adjacent" appointments (i.e., other appointments immediately before or after the proposed meeting). When the infobar checks a published calendar, the infobar instructs the calendar to notify to infobar if there are any subsequent changes to the calendar. Similarly, the infobar may itself include a control (e.g., a button) that would allow the user to immediately open his or her calendar program and display the conflicting appointment. When used in conjunction with contact management, the infobar may check the user's contact folder and indicate that presence of other contacts from the same company or other similar information.

An important feature of the infobar is its ability to rank the infobar items according to priority. Each possible infobar item has a predetermined priority ranking. When the items are displayed, the highest priority item is displayed at the top. The priority is determined by a property matrix, which is described below in conjunction with FIGS. 10–12. Those skilled the art will appreciate that each items priority is predetermined, and is not determined by the user. Instead, the priority is determined by the person who designed the form and added that particular if-then statements to the property matrix.

Turning now to FIG. 9, the preferred method for highlighting information in a message item will be described. FIG. 9 is a flow diagram illustrating an exemplary method 900 for examining a message item and highlighting information contained in the item. The method is carried out by the computer 10 (FIG. 1) in response to instructions provided in a program module. The method 900 is executed as the computer displays the message for viewing by the user.

The method 900 begins at step 905 and proceeds to step 910. At step 910 the computer receives from the user input identifying the message item that is to be viewed. At step 915 the computer determines which type of form is associated with the selected message item. For example, if the message item is an e-mail message, the computer will select an e-mail form. Similarly, if the message item is a meeting request, the computer will select a meeting request form.

At step 920 the computer examines various properties from the selected message item. In an embodiment of the present invention, the examined properties are evaluated by applying a series of if-then statements to the message item. The if-then statements are associated with the selected form. Exemplary if-then statements for various types of forms are illustrated in FIGS. 10–12, which are discussed below.

In some cases, the if-then statements require the computer to read and assess information external to the selected message item. For example, if the message item is a meeting request, the computer must read external data associated with the user's calendar program, and determine whether a conflict exists. In the "MICROSOFT OUTLOOK" program, the user's calendar is published in a manner that makes it available to the infobar code.

At step 925 the computer composes a list of proposed infobar items based on the results of the if-then statements applied at step 920. The process of composing the infobar items was described above in conjunction with the conditional, dynamic, computed, and state dependent features of the exemplary infobar code.

At step 930 the computer prioritizes the proposed infobar items according to predetermined priority rankings, which, in an exemplary embodiment, are embodied in the order the if-then statement are applied. The computer also determines whether the number of proposed infobar items exceeds a predetermined maximum number. If so, only the highest priority items will be displayed in the infobar. In an exemplary embodiment, the infobar will display no more than four infobar items.

At step 935 the computer displays the message in the context of the selected form, which was identified by the computer at step 910. The displayed form will include an infobar, unless the results of the if-then statements resulted in no infobar items being generated for display. If an infobar item is displayed, the displayed items will listed in order to decreasing priority and will be limited to a predetermined number.

Those skilled in the art will understand that the infobar is recalculated when relevant data is changed. Thus, when the user responds to a message, the infobar will be recalculated, and a "please respond" type of message will be replaced with a message that indicates when the response was sent. As mentioned earlier, this recalculation will also take place when calendar events change.

FIGS. 10–12 are matrices of the properties that are examined for three types of forms. In each figure, the property that is tested is listed along the vertical axis, and the responses for the various message states are listed along the horizontal axis. Those skilled in the art will understand that the tests and responses described in the matrices may be implemented in an appropriate program module as a series of if-then statements, which are applied to the message item's properties.

FIG. 10 is an exemplary matrix associated with e-mail message items. The properties that are examined are enumerated from 0 to 10. The property states that are tested as part of the if-then statements are listed below each enumerated item. The different message states are listed along the top of the form.

Thus, if the user is composing an e-mail message item, the infobar code will examine the property that indicates whether the message has been sent. If the message is unsent, the infobar code will provide an infobar item alerting the user that "This message has not been sent." The "unsent" property is not examined when an e-mail message is opened with a read message form or a sent message form.

FIG. 11 is an exemplary matrix associated with appointment message items. The properties that are examined are enumerated from 0 to 4. The property states that are tested as part of the if-then statements are listed below each enumerated item. The different message states are listed along the top of the form.

Thus, if the user is reading a meeting request, the infobar code will examine the property that indicates the meeting date and the user's published calendar data, which is external to the message item. If the appointment is in the past, conflict with other appointments, and/or is adjacent other appointments, the infobar items will include warnings to that effect.

FIG. 12 is an exemplary matrix associated with task-related message items. The properties that are examined are enumerated from 0 to 3. The property states that are tested as part of the if-then statements are listed below each enumerated item. The different message states are listed along the top of the form.

Thus, if the user is reading a task message, the infobar code will examine the property that indicates the due date. If the due date is in the past, the infobar items will include warnings to that effect. Similar, if the due date is within the next week, the infobar will includes an indication that "This task is due in x days," "This task is due tomorrow," or "This task is due today." Those skilled in the art will appreciate that this and other types of autoformat technology allow the infobar items to be presented in an appropriate natural language format. In the U.S., the infobar will display messages in a natural English language format. The infobar may also be localized to other languages.

From these examples, it can been seen that the enumerated items identify which message property is tested, while the item listed below the property indicates the condition that is tested by the if-then statement. Whether the if-then statement is applied, and the outcome of the if-then statement are indicated by the columns indicating the state of the e-mail message. The information represented by the matrixes is implemented in code that performs a series of if-then statements.

Summary of the Detailed Description

From the foregoing description, it will be appreciated that the present invention provides an improved system and method for highlighting important information associated with a message item. An exemplary system and method are embodied in one or more program modules that form a part of a desktop information manager program. In summary, the form that is used to display a message item includes an infobar control object. The information that is displayed in the infobar is determined by associated infobar code, which examines the message item's properties and relevant external information. The examination is performed by applying a series of if-then statements to selected properties. The properties that are selected and the messages that result are determined by the type of message item, the form used to view the message item, and the state of the message item. The resulting infobar items are prioritized and displayed to the user.

The foregoing system may conveniently be implemented in one or more program modules that are based upon the flow diagram of FIG. 9 and the property matrices of FIGS. 10–12. No particular programming language has been described for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

Those skilled in the art will appreciate that the present invention automatically draws out and displays the most important information associated with a message item. The information is obtained from more than one property in the message, and may also include or rely on data external to the message item. Without the infobar, this information may not be readily apparent or available to the user. Furthermore, the infobar automatically formats the infobar items in readable language format. Thus, an exemplary embodiment of the infobar summarizes the state of the message item in one concentrated area in natural language. This prevents the user from having to locate, read, and examine a variety of fields in order to determine the important aspects of the message item.

Furthermore, although the invention was described in the context of a program in which the property matrices are fixed, those skilled in the art will appreciate that the present invention is extensible and that forms designers may be able to design forms that employ additional properties, which are then associated with additional entries in the properties matrix. Similar, although the described embodiment displays icons and text in the infobar, those skilled in the art will appreciate that the infobar may include active controls and/or animated objects in order to increase the visibility of certain items and to facilitate the user's access to other relevant information.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-readable medium on which is stored a computer program for highlighting information associated with an electronic message item containing sender and recipient data, the computer program comprising instructions which, when executed by a computer, perform the steps of:

testing the state of a plurality of message properties associated with the message item containing the sender and recipient data, wherein the message properties are defined by user input provided upon creation of the message item;

in response to testing the state of a plurality of message properties, automatically providing, in response to the state of the message properties, at least one information item based upon one or more message properties indicating that at least one message property has a predetermined state;

displaying the message item; and displaying at least one information item in an information object associated with the message item while simultaneously displaying the message item.

2. The computer-readable medium of claim 1, wherein the program further performs the steps of evaluating data external to the message item and providing an information item describing the relationship between the external data and at least one message property.

3. The computer-readable medium of claim 1, wherein providing at least one information item comprises selecting a predefined text string.

4. The computer-readable medium of claim 1, wherein providing at least one information item comprises dynamically forming a text string in response to the state of the message item.

5. The computer-readable medium of claim 1, wherein providing at least one information item comprises:

performing a calculation involving at least one of the message properties; and incorporating the result of the calculation in the information item.

6. The computer-readable medium of claim 1, wherein the program is further operative to prioritize a plurality of information items prior to displaying the information items.

7. The computer-readable medium of claim 1, wherein the program is further operative to, in response to a change in a message property, perform the steps of testing the state of the changed message property, providing an information item indicating the state of the change message property, and displaying the information item in the information object.

8. A method for displaying information in an information bar, wherein the information is associated with an electronic message item including message properties and containing sender and recipient data, comprising the steps of:

(a) evaluating the state of a plurality of message properties associated with the message item containing the sender and recipient data, wherein the message properties are defined by user input provided upon creation of the message item;

(b) in response to evaluating the state of a plurality of message properties, automatically or based upon one or more evaluated message properties, composing an information item based upon one or more evaluated message properties in the information bar describing the state of the message item;

(c) displaying the message item; and (d) displaying the information item in the information bar in conjunction with the message item while simultaneously displaying the message item.

9. The method of claim 8, wherein composing an information item comprises selecting a predefined text string associated with at least one of the message properties.

10. The method of claim 8, wherein composing an information item comprises dynamically forming a text string in response to the state of the message item.

11. The method of claim 8, wherein composing an information item comprises:

performing a calculation involving at least one of the message properties; and incorporating the result of the calculation in the information item.

12. The method of claim 8, further comprising the steps of composing a second information item describing the state of the message item; and prioritizing the information item and the second information item.

13. The method of claim 8, further comprising the step of repeating steps (a), (b), and (d) in response to a change in one of the message properties.

14. A method for displaying information associated with an electronic message item including message properties, comprising the steps of:

(a) evaluating the state of a plurality of message properties associated with the message item;

(b) composing an information item describing the state of the message item;

(c) displaying the message item;

(d) displaying the information item in an information object in conjunction with the message item; and (e) composing a second information item describing the state of the message item; and prioritizing the information item and the second information item, wherein prioritizing the information item and the second information item comprises applying a series of conditional tests to the message item in a predetermined order.

15. A method for displaying information in an information bar, wherein the information is associated with an electronic message item including message properties and containing sender and recipient data, comprising the steps of:

(a) evaluating the state of a plurality of message properties associated with the message item containing the sender and recipient data, wherein the message properties are defined by user input provided upon creation of the message item;

(b) in response to evaluating the state of a plurality of message properties, automatically or based upon data contained in one or more message properties, composing an information item, based upon one or more message properties, in the information bar describing the state of the message item;

(c) displaying the message item; and (d) displaying the information item in the information bar in conjunction with the message item while simultaneously displaying the message item.

16. A method for displaying information in an information bar, wherein the information is associated with an electronic message item including message properties and containing sender and recipient data, comprising the steps of:
  (a) evaluating the state of a plurality of message properties associated with the message item containing the sender and recipient data, wherein the message properties are defined by user input provided upon creation of the message item;
  (b) in response to evaluating the state of a plurality of message properties, automatically or based upon data that is external to the electronic message item, composing an information item, based on one or more message properties, in the information bar describing the state of the message item;
  (c) displaying the message item; and
  (d) displaying the information item in the information bar in conjunction with the message item while simultaneously displaying the message item.

17. A method for displaying information in an information bar, wherein the information is associated with an electronic message item including message properties and containing sender and recipient data, comprising the steps of:
  (a) evaluating the state of a plurality of message properties associated with the message item containing the sender and recipient data, wherein the message properties are defined by user input provided upon creation of the message item;
  (b) in response to evaluating the state of a plurality of message properties, automatically or based upon a priority item associated with one or more evaluated message properties, composing an information item, based upon one or more message properties, in the information bar describing the state of the message item;
  (c) displaying the message item; and
  (d) displaying the information item in the information bar in conjunction with the message item while simultaneously displaying the message item.

* * * * *

UNITED STATES PATENT AND TRADEMARK OFFICE
CERTIFICATE OF CORRECTION

PATENT NO.     : 6,708,202 B1                                                    Page 1 of 1
DATED          : March 16, 2004
INVENTOR(S)    : Shuman et al.

It is certified that error appears in the above-identified patent and that said Letters Patent is hereby corrected as shown below:

Column 3,
Line 13, insert -- at -- after the word "provides".

Column 9,
Line 4, insert -- is -- after the word "message".

Column 16,
Line 5, delete "that" and insert -- the -- in place thereof.

Column 17,
Line 3, insert -- be -- after the word "will".
Line 3, delete "to" and insert -- of -- in place thereof.

Signed and Sealed this

Eighth Day of June, 2004

JON W. DUDAS
*Acting Director of the United States Patent and Trademark Office*